Patented Mar. 22, 1932

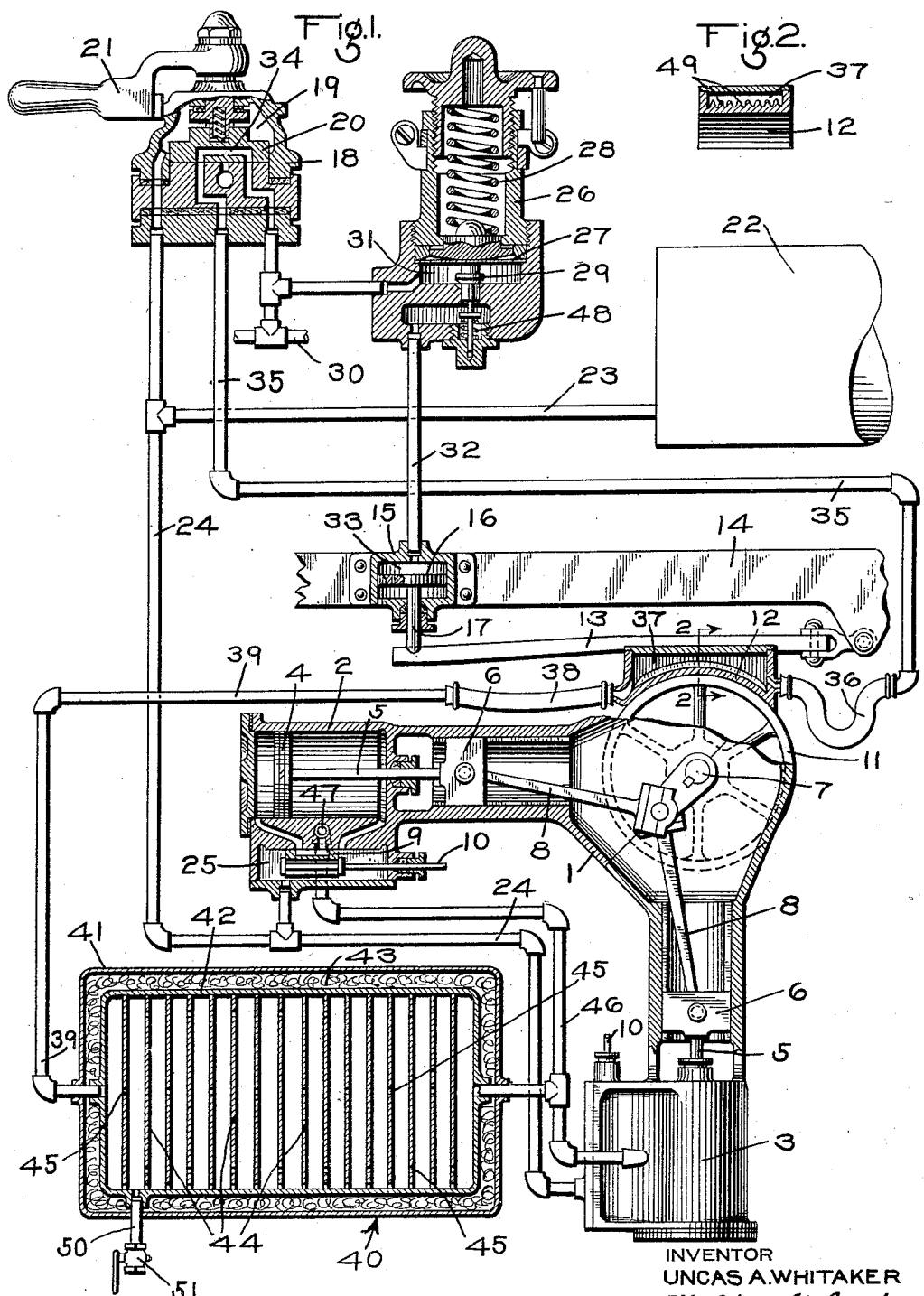

1,850,610

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

AIR PURIFIER

Application filed December 11, 1929. Serial No. 413,308.

This invention relates to air purifiers and more particularly to an air purifier adapted to remove water vapor from the air supply of a fluid pressure brake system.

When air containing water vapor is compressed to a higher pressure and is then allowed to cool to its original temperature, it becomes more highly saturated with water vapor than in its original state, because of the smaller volume.

In compressing air for the locomotive air supply of a fluid pressure brake system, the pressure is sufficient to exceed the dew point of the air, so that moisture is precipitated. Part of this moisture remains suspended in the air and is carried over into the brake system, through the usual feed valve or through the full release port of the automatic brake valve device.

This moisture collects in the hose couplings, dirt collectors, auxiliary reservoirs, and the like, of the brake system and sometimes causes brake failures, due to ice forming and stopping air passages, and due to corrosion caused by the water in the various air brake devices.

The most efficient means of removing moisture from air is to cool the air below the temperature at which it is to be used. A slight reduction in temperature causes a relatively large decrease in the amount of moisture that the air will hold.

According to one object of my invention, it is proposed to cool the air, so as to precipitate the water out of the air, by utilizing the energy otherwise dissipated in reducing the air pressure from main reservoir pressure to brake pipe pressure.

With the standard feed valve device employed in fluid pressure brake systems, the difference in pressure between the main reservoir and the brake pipe is expended in internal friction, so that the expansion of the air is practically at a constant temperature. If the air could be made to expend the difference in pressure between the main reservoir and the brake pipe in doing external work, then a reduction in temperature would take place, sufficient to cause a precipitation of a large percentage of the moisture in the air.

According to my invention, an air engine is substituted for the supply portion of the feed valve device, so that the drop in pressure from main reservoir to brake pipe pressure is expended in doing external work through the operation of the air engine.

In the accompanying drawings: Fig. 1 is a diagrammatic view, partly in section, of an air purifying apparatus embodying my invention; and Fig. 2 a section on the line 2—2 of Fig. 1.

The air engine is preferably, though not necessarily, so designed that the engine will start in any position, when air is admitted thereto, and accordingly, as shown in the drawings, the air engine 1 is provided with two similar engine cylinders 2 and 3 disposed 90° apart.

Each cylinder contains a piston 4 connected by piston rod 5 to a crosshead 6, which is connected to a common crank shaft 7 by a connecting rod 8. The air supply to the cylinder is controlled by a slide valve 9 having an operating stem 10 which is operatively connected to a moving part of the engine in the usual manner.

The crank shaft 7 carries a brake wheel 11 adapted to be frictionally engaged by a hollow brake shoe 12. Said shoe is carried by a lever 13, pivotally mounted on the locomotive frame 14. Secured to the frame 14 is a small cylinder 15 containing a piston 16 having a stem 17 adapted to engage the lever 13 near its outer end.

The reference numeral 18 indicates the usual engineer's brake valve comprising a casing having a valve chamber 19 containing a rotary valve 20 adapted to be operated by a handle 21. The usual main reservoir 22 on the locomotive is connected through pipe 23, with a pipe 24 which leads to valve chamber 19. The main reservoir pipe 24 is also connected to the valve chamber 25 of the air engine cylinders 2 and 3.

The regulating portion 26 of a feed valve device is provided comprising a casing in which is mounted a flexible diaphragm 27, subject on one side to the pressure of an adjustable regulating spring 28 and adapted to control the operation of a regulating valve 29. The usual brake pipe 30 is connected to the chamber 31 below the diaphragm 27 and when the valve 29 is unseated, communication is established from the brake pipe 30, through pipe 32 to chamber 33 of the cylinder 15.

In the running position of the engineer's brake valve, the brake pipe 30 is connected, through a cavity 34 in the rotary valve 20, with a pipe 35, which pipe is connected, through a flexible hose 36, with chamber 37 in the brake shoe 12. Said chamber is also connected, through a flexible hose 38, with a pipe 39, which leads to a water separator 40.

The separator 40 may comprise an outer closed shell 41 and an inner cylinder or reservoir 42 having the space between the shell and the reservoir packed with a suitable heat insulating material 43. Within the reservoir 42 a series of spaced disks 44 are mounted to serve as baffle plates, the disks being provided with staggered openings 45, to permit the flow of air through the reservoir. The pipe 39 opens into the reservoir 42 at one end and an exhaust pipe 46 opens into the other end of the reservoir. Said exhaust pipe 46 is connected to the engine exhaust ports 47 of the air engines 2 and 3.

In operation, fluid under pressure is admitted from the main reservoir 22 through pipe 24 to the valve chambers 25 of the engine cylinders 2 and 3 and the pistons 4 in the cylinders are caused to reciprocate as in the usual engine by the operation of the slide valve 9 to admit and release fluid under pressure to and from the cylinders 2 and 3 at opposite sides of the piston 4.

Fluid under pressure is expanded in the engine cylinders to approximately brake pipe pressure and the temperature of the fluid is reduced by the expansion. The fluid at reduced pressure and temperature exhausted from the engine cylinders, flows to the separator 40 and excess moisture in the fluid is deposited in the separator.

Fluid from the separator flows out through pipe 39 and through the chamber 37 in the brake shoe 12 to pipe 35 and thence flows through cavity 34 in the rotary valve 20 of the engineer's brake valve 18, if the rotary valve is in running position, to the brake pipe 30.

When the brake pipe pressure is less than the setting of the spring 28 of the regulating portion 26, the diaphragm 27 will be operated by the spring to seat the valve 29, so as to cut off the supply of fluid under pressure from the brake pipe to the cylinder 15. The pressure on the piston 16 is thus relieved, and the brake shoe 12 is therefore not pressed against the brake wheel 11. The air engine 1 then operates at increased speeds, so as to increase the rate of supply of fluid under pressure to the brake pipe.

When the brake pipe pressure has been increased to a degree exceeding the pressure of spring 28, the diaphragm 27 is deflected upwardly, permitting the valve 29 to be unseated by spring 48, so that fluid under pressure is supplied from the brake pipe to the piston chamber 33. The piston 16 is then subjected to fluid pressure which acts through the stem 17, on lever 13, so as to apply pressure to the brake shoe 12.

The frictional engagement of the brake shoe 12 on the brake wheel 11 acts as a brake to reduce the speed of the air engine 1, so that the supply of fluid under pressure to the brake pipe is reduced. The brake shoe is heated by the frictional engagement with the brake wheel, so that the air passing through the chamber 37 is heated.

The operation has been described as though the valve 29 alternately opened and closed, but actually, the valve 29 will normally assume a position, such that the rate of speed of the air engine, as controlled by the brake shoe 12 will be just sufficient to maintain the brake pipe pressure at a predetermined pressure, as determined by the setting of the regulating spring 28.

The interior wall of the brake shoe 12 adjacent to the brake wheel 11, may be provided with corrugations 49, as shown in Fig. 2, so as to provide a larger heat radiating surface.

A drain pipe 50 is connected to the reservoir 42 of the water separator and a drain cock 51 is disposed in said pipe, so that, when desired, water accumulating in the reservoir may be drained off.

The air from the separator being reheated by passing through the chamber 37 of the brake shoe 12, is in a condition to take up moisture, so that if there is moisture in the brake pipe of the fluid pressure brake system, due to the direct supply of fluid from the main reservoir to the brake pipe in the full release position of the engineer's brake valve, such moisture will be taken up by the air and even if the temperature of the atmosphere is lower than the temperature of the air, the air not being saturated, water will not be precipitated in the parts of the brake system.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The process of conditioning fluid under pressure for use in a fluid pressure system which consists in first reducing the pressure of fluid from a higher pressure to a lower pressure carried in the system by performing external work with the reducing fluid pressure to thereby reduce the temperature of the fluid, in then separating moisture from the fluid, and in then reheating the fluid by heat generated in performing said external work.

2. Apparatus for conditioning fluid under pressure for use in a fluid pressure system, comprising a source of fluid under pressure, an engine operated by fluid under pressure supplied from said source, a device for separating moisture from fluid, to which the exhaust fluid under pressure from the engine is supplied at a lower pressure and a reduced temperature and from which fluid under pressure is supplied to the system, and means controlled by variations in fluid pressure in the fluid pressure system for regulating the speed of the engine.

3. Apparatus for conditioning fluid under pressure for use in a fluid pressure system, comprising a source of fluid under pressure, an engine operated by fluid under pressure supplied from said source, a device for separating moisture from fluid, to which the exhaust fluid under pressure from the engine is supplied at a lower pressure and a reduced temperature and from which fluid under pressure is supplied to the system, and means for varying the speed of the engine inversely as the pressure of fluid in the fluid pressure system varies.

4. Apparatus for conditioning fluid under pressure for use in a fluid pressure system, comprising a source of fluid under pressure, an engine operated by fluid under pressure supplied from said source, a device for separating moisture from fluid, to which the exhaust fluid under pressure from the engine is supplied at a lower pressure and a reduced temperature and from which fluid under pressure is supplied to the system, a braking means for varying the speed of the engine, and means controlled by variations in fluid pressure in the fluid pressure system for varying the braking power of said braking means.

5. Apparatus for conditioning fluid under pressure for use in a fluid pressure system, comprising a source of fluid under pressure, an engine operated by fluid under pressure supplied from said source, a device for separating moisture from fluid, to which the exhaust fluid under pressure from the engine is supplied at a lower pressure and a reduced temperature and from which fluid under pressure is supplied to the system, a braking means for varying the speed of the engine, and means for heating the fluid supplied to the system by heat generated by said braking means.

6. Apparatus for conditioning fluid under pressure for use in a fluid pressure system, comprising a source of fluid under pressure, an engine operated by fluid under pressure supplied from said source, a device for separating moisture from fluid, to which the exhaust fluid under pressure from the engine is supplied at a lower pressure and a reduced temperature and from which fluid under pressure is supplied to the system, a brake for regulating the speed of the engine, fluid pressure operated means for operating said brake, and valve means operated upon a predetermined increase in fluid pressure in said system for supplying fluid under pressure to said fluid pressure operated means.

In testimony whereof I have hereunto set my hand, this 5th day of December, 1929.

UNCAS A. WHITAKER.